J. R. BRUECKNER.
INSTRUMENT FOR DETERMINING CRITICAL TEMPERATURES.
APPLICATION FILED DEC. 30, 1916.
1,323,824.
Patented Dec. 2, 1919.
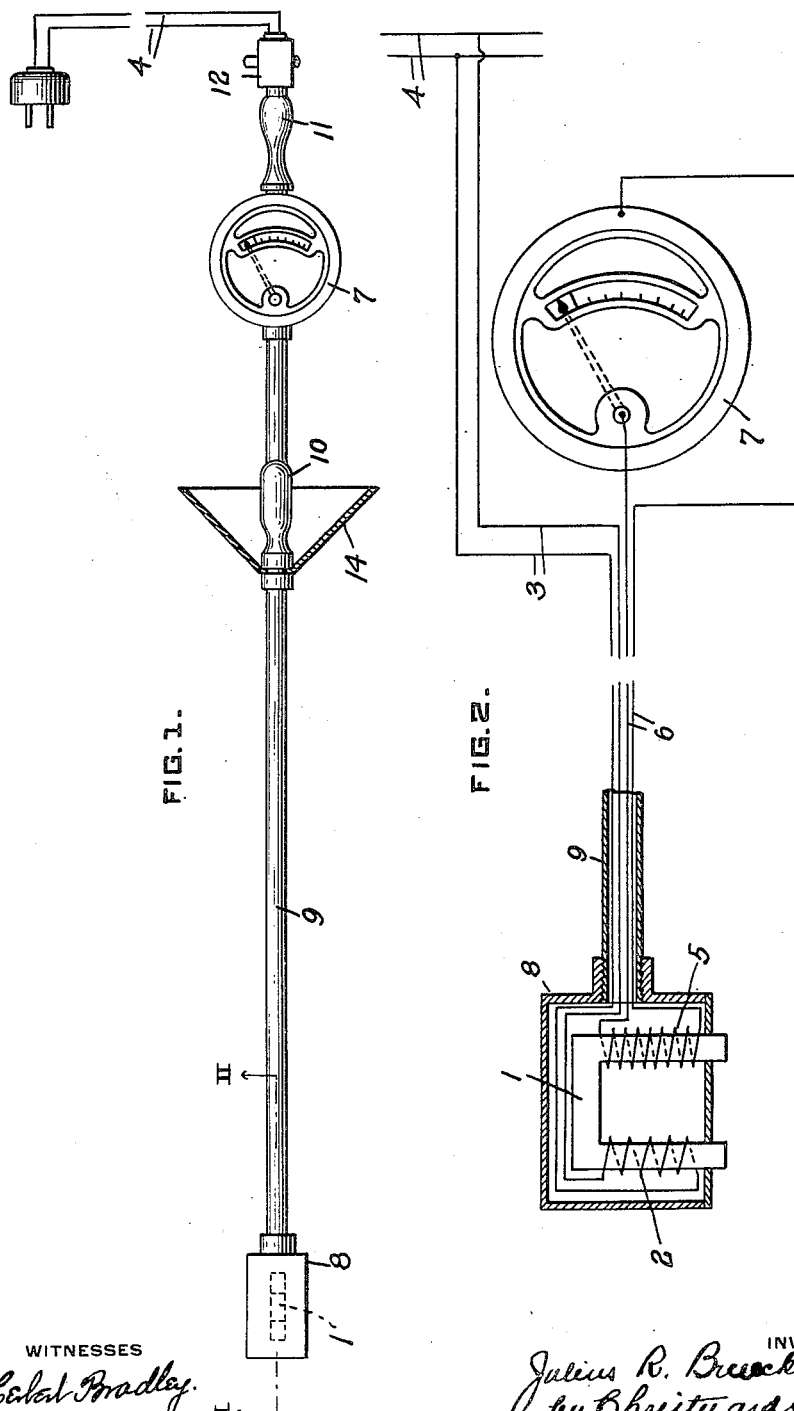

UNITED STATES PATENT OFFICE.

JULIUS R. BRUECKNER, OF WILKINSBURG, PENNSYLVANIA, ASSIGNOR TO THE GIBB INSTRUMENT COMPANY, OF PITTSBURGH, PENNSYLVANIA, A CORPORATION OF PENNSYLVANIA.

INSTRUMENT FOR DETERMINING CRITICAL TEMPERATURES.

1,323,824.　　　　　　　Specification of Letters Patent.　　　Patented Dec. 2, 1919.

Application filed December 30, 1916. Serial No. 139,850.

*To all whom it may concern:*

Be it known that I, JULIUS R. BRUECKNER, residing at Wilkinsburg, in the county of Allegheny and State of Pennsylvania, a citizen of the United States, have invented or discovered certain new and useful Improvements in Instruments for Determining Critical Temperatures, of which improvements the following is a specification.

In the heat treatment of alloys of steel and other metals it is desirable to determine accurately the time when the article or blank being treated has been heated to the critical temperature. For this purpose various instruments have been devised, some of which are based upon the well known fact that some metals are more or less magnetic at all temperatures up to the critical temperature, and that at such temperature or point they lose all or substantially all of their magnetic properties, that is to say they lose their magnetic conductivity.

The object of my invention is to provide an instrument for the purpose described, which is based on the above stated magnetic properties of metal, and which is simple in construction and sensitive and accurate in operation.

In the accompanying sheet of drawings, forming part of my specification, I have illustrated the preferred embodiment of my invention. Figure 1 is a combined side elevation and partly longitudinal sectional view of the instrument, and Fig. 2 a combined wiring diagram and detail sectional view of the instrument to enlarged scale, the plane of the sectional view being indicated by the line II—II, Fig. 1.

The instrument which I provide includes in its structure a transformer and a voltmeter suitably mounted on a rod. The primary winding of the transformer is electrically connected to an alternating circuit, while the secondary winding is connected to the voltmeter. The transformer core is constructed with a gap which may be closed by placing the free ends of the core in contact with the normally magnetic metal to be heated. When the magnetic field is thus closed, it will be understood that the voltage induced in the secondary winding will be indicated on the voltmeter. Likewise, when, at the critical point, the normally magnetic metal loses its magnetism, little if any voltage will be induced in the secondary winding, which will be indicated on the voltmeter by the hand thereof moving to or substantially to the zero point.

Referring to the embodiment of my invention illustrated in the drawing, the transformer may consist of a U-shaped core 1 provided with a primary winding 2 connected by conductors 3 to a line 4, and with a secondary winding 5 suitably connected by conductors 6 to the voltmeter 7. The transformer is mounted in a suitable casing 8 of non-magnetic and preferably heat-insulating material, through a side of which the ends of the core project in positions to be placed in contact with a piece of metal to be tested. By providing, as indicated, a closed casing, for the transformer, the winding thereof will be less liable to injury due to the heat of the furnace and the metal to be tested.

The casing 8 is attached to one end of a tubular rod 9, which forms a conduit for the conductors 3 and 6, and to the opposite end of which the voltmeter 7 is attached. For manipulating the instrument, the rod is provided with heat insulated grips 10 and 11, the former of which may be protected by a shield 14 shown in horizontal section in Fig. 1. The end of the rod may also be provided with an electric switch 12 for controlling the flow of current through the main circuit wires 3.

In using the instrument, the projecting ends of the core 1 are placed on the metal being heated. If the voltmeter shows a current reading the operator knows that the critical temperature of the metal has not yet been reached. If, on the contrary, the voltmeter shows little or no current reading, then the operator knows that the critical temperature has been reached. By taking readings at sufficiently frequent intervals, the time at which the critical temperature is reached may be accurately ascertained. Furthermore, it has been found that as the metal apporaches the critical point there is a gradual falling away of its magnetic conductivity. Thus, by the gradually diminishing readings of the voltmeter, the operator may observe the approach of the critical temperature.

I claim as my invention:

1. In an instrument for determining the critical temperature of normally magnetic metals, the combination of a transformer comprising primary and secondary windings on a core having an open gap, a casing inclosing said transformer except for the free ends of the core thereof which ends project through the casing, a tubular rod attached at one end to said casing, a voltmeter secured to the other end of said rod, electrical conductors leading from said primary winding through said rod and adapted to be connected to a source of alternating current supply, and electrical conductors leading from said secondary winding through said rod and electrically connected to said voltmeter.

2. In an instrument for determining the critical temperature of normally magnetic metals, the combination of a transformer comprising primary and secondary windings on a core having an open gap, a casing for said transformer, a tubular rod attached to one end of said casing, a voltmeter, electrical conductors leading from said primary winding through said rod and adapted to be connected to a source of alternating current supply, and electrical conductors leading from said secondary winding through said rod and electrically connected to said voltmeter.

In testimony whereof I have hereunto set my hand.

JULIUS R. BRUECKNER.

Witnesses:
W. H. GIBB,
GEO. SCHINDLER.